(12) United States Patent
Fripp et al.

(10) Patent No.: US 10,260,309 B2
(45) Date of Patent: Apr. 16, 2019

(54) DOWNHOLE TOOLS COMPRISING AQUEOUS-DEGRADABLE SEALING ELEMENTS OF THERMOPLASTIC RUBBER

(71) Applicant: Halliburton Energy Services, Inc., Houston, TX (US)

(72) Inventors: Michael Linley Fripp, Carrollton, TX (US); Zachary William Walton, Carrollton, TX (US); Charles Timothy Smith, McKinney, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 173 days.

(21) Appl. No.: 15/106,380

(22) PCT Filed: Dec. 22, 2015

(86) PCT No.: PCT/US2015/067286
§ 371 (c)(1),
(2) Date: Jun. 20, 2016

(87) PCT Pub. No.: WO2016/204814
PCT Pub. Date: Dec. 22, 2016

(65) Prior Publication Data
US 2018/0163503 A1 Jun. 14, 2018

Related U.S. Application Data

(63) Continuation-in-part of application No. PCT/US2015/035812, filed on Jun. 15, 2015, which
(Continued)

(51) Int. Cl.
*E21B 33/12* (2006.01)
*E21B 33/128* (2006.01)
(Continued)

(52) U.S. Cl.
CPC .......... *E21B 33/1208* (2013.01); *C08K 5/092* (2013.01); *E21B 29/02* (2013.01);
(Continued)

(58) Field of Classification Search
CPC .................................................. E21B 33/1208
(Continued)

(56) References Cited

U.S. PATENT DOCUMENTS

| 5,883,199 A | 3/1999 | McCarthy et al. |
| 7,168,494 B2 | 1/2007 | Starr et al. |

(Continued)

FOREIGN PATENT DOCUMENTS

| EP | 0910598 B1 | 5/2005 |
| WO | 2014192885 A1 | 12/2014 |

(Continued)

OTHER PUBLICATIONS

International Search Report and Written Opinion received in corresponding PCT Application No. PCT/US2015/067286, dated May 2, 2016.
(Continued)

*Primary Examiner* — Taras P Bemko
(74) *Attorney, Agent, or Firm* — McGuireWoods LLP

(57) ABSTRACT

Downhole tools and methods and systems associated therewith, wherein the downhole tools comprise a body and at least one sealing element comprising an aqueous-degradable thermoplastic rubber copolymer composed of a thermoplastic component and a rubber component. The thermoplastic component is present in an amount of about 5% to about 95% by weight of the aqueous-degradable thermoplastic rubber copolymer, and at least a portion of the sealing element hydrolytically degrades when exposed to an aqueous fluid.

18 Claims, 3 Drawing Sheets

Related U.S. Application Data is a continuation-in-part of application No. PCT/US2015/035823, filed on Jun. 15, 2015, which is a continuation-in-part of application No. PCT/US2014/045535, filed on Jul. 7, 2014.

(51) Int. Cl.

| | | |
|---|---|---|
| *E21B 43/26* | (2006.01) | |
| *E21B 29/02* | (2006.01) | |
| *E21B 33/129* | (2006.01) | |
| *C08K 5/092* | (2006.01) | |

(52) U.S. Cl.
CPC ............ *E21B 33/12* (2013.01); *E21B 33/128* (2013.01); *E21B 33/129* (2013.01); *E21B 43/26* (2013.01)

(58) Field of Classification Search
USPC ......................................... 166/387
See application file for complete search history.

(56) References Cited

U.S. PATENT DOCUMENTS

| | | | |
|---|---|---|---|
| 7,699,101 B2 | 4/2010 | Fripp et al. | |
| 2001/0027225 A1* | 10/2001 | Downie | C08K 5/0033 523/124 |
| 2004/0261999 A1 | 12/2004 | Nguyen | |
| 2005/0205264 A1 | 9/2005 | Starr et al. | |
| 2005/0205266 A1 | 9/2005 | Todd et al. | |
| 2006/0042798 A1 | 3/2006 | Badalamenti et al. | |
| 2008/0135249 A1* | 6/2008 | Fripp | E21B 33/1208 166/285 |
| 2011/0005778 A1 | 1/2011 | Foster et al. | |
| 2011/0067889 A1 | 3/2011 | Marya et al. | |
| 2011/0226789 A1* | 9/2011 | Georgelos | B32B 27/18 220/677 |
| 2013/0073812 A1 | 3/2013 | Kanai et al. | |
| 2013/0264054 A1 | 10/2013 | East et al. | |
| 2014/0076571 A1 | 3/2014 | Frazier et al. | |
| 2014/0116701 A1 | 5/2014 | Tang | |

FOREIGN PATENT DOCUMENTS

| | | |
|---|---|---|
| WO | WO-2015156827 A1 | 10/2015 |
| WO | WO-2016/003759 A1 | 1/2016 |

OTHER PUBLICATIONS

Ali et al., Synthesis of biodegradable and flexible, polylactic acid based, thermoplastic polyurethane with high gas barrier properties, Polymer International (Sep. 2014).

Tanrattanakul et al., Effect of different plasticizers on the properties of bio-based thermoplastic elastomer containing poly(lactic acid) and natural rubber, eXPRESS Polymer Letters (Jan. 2014).

Australian Office Action from Australian Patent Application No. 2016280375, dated May 3, 2018, 7 pages.

Australian Examination Report from Australian Patent Application No. 2015398727, dated Feb. 9, 2018, 8 pages.

\* cited by examiner

DOWNHOLE TOOLS COMPRISING AQUEOUS-DEGRADABLE SEALING ELEMENTS OF THERMOPLASTIC RUBBER

CROSS-REFERENCE TO RELATED APPLICATIONS

This application claims priority to PCT/US2014/045535, titled "Downhole Tools Comprising Aqueous-Degradable Sealing Elements," filed Jul. 7, 2014; PCT/2015/035823, titled "Downhole Tools Comprising Aqueous-Degradable Elastomer Sealing Elements with Carbodiimide," filed Jun. 15, 2015; and PCT/2015/035812, titled "Downhole Tools Comprising Cast Degradable Sealing Elements," and filed Jun. 15, 2015.

BACKGROUND

The present disclosure generally relates to downhole tools comprising aqueous-degradable sealing elements and, more specifically, to downhole tools comprising an aqueous-degradable sealing element comprising a thermoplastic rubber copolymer.

A variety of downhole tools are used within a wellbore in connection with producing or reworking a hydrocarbon bearing subterranean formation. The downhole tool may comprise a wellbore zonal isolation device capable of fluidly sealing two sections of the wellbore from one another and maintaining differential pressure (i.e., to isolate one pressure zone from another). The wellbore zonal isolation device may be used in direct contact with the formation face of the wellbore, with casing string, with a screen or wire mesh, and the like.

After the production or reworking operation is complete, the seal formed by the downhole tool must be broken and the tool itself removed from the wellbore. The downhole tool must be removed to allow for production or further operations to proceed without being hindered by the presence of the downhole tool. Removal of the downhole tool(s) is traditionally accomplished by complex retrieval operations involving milling or drilling the downhole tool for mechanical retrieval. In order to facilitate such operations, downhole tools have traditionally been composed of drillable metal materials, such as cast iron, brass, or aluminum. These operations can be costly and time consuming, as they involve introducing a tool string (e.g., a mechanical connection to the surface) into the wellbore, milling or drilling out the downhole tool (e.g., at least breaking the seal), and mechanically retrieving the downhole tool or pieces thereof from the wellbore to bring to the surface.

To reduce the cost and time required to mill or drill a downhole tool from a wellbore for its removal, degradable downhole tools have been developed. Traditionally, however, such degradable downhole tools have been designed only such that the degradable portion includes the tool body itself and not any sealing element of the downhole tool. This is particularly evident because the degradable materials that have been proposed for use in forming a downhole tool body are often highly brittle and are physically or chemically incapable of exhibiting expansive or elastic properties necessary for a sealing element. Instead, the known degradable downhole tools may degrade such that it no longer provides the structural integrity necessary for achieving an effective seal with the non-degradable sealing element.

BRIEF DESCRIPTION OF THE DRAWINGS

The following figures are included to illustrate certain aspects of the embodiments and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
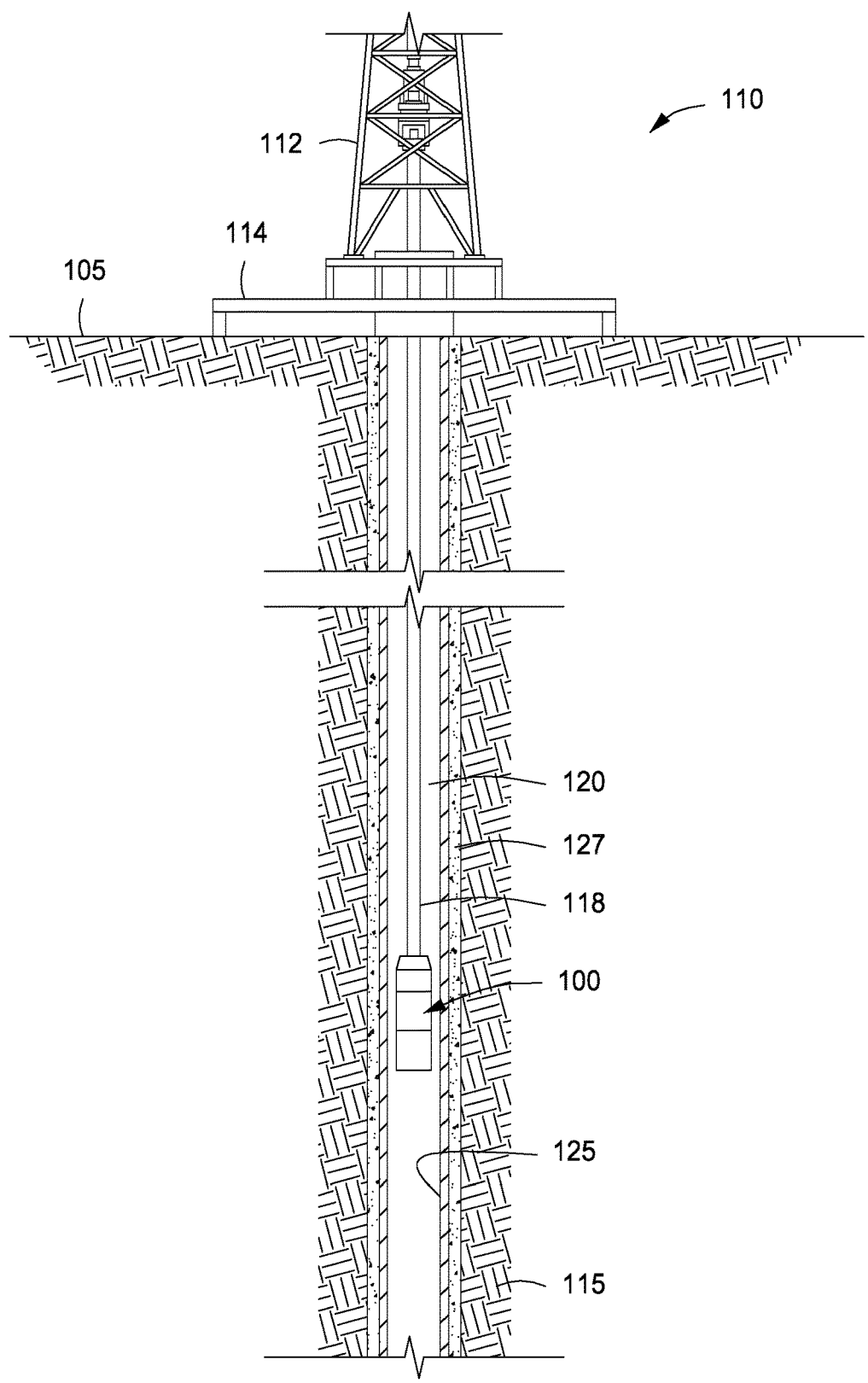
FIG. 1 illustrates a cross-sectional view of a well system comprising a downhole tool, according to one or more embodiments described herein.

The present disclosure generally relates to downhole tools comprising aqueous-degradable sealing elements and, more specifically, to downhole tools comprising an aqueous-degradable sealing element comprising a thermoplastic rubber copolymer.

As used herein, the term "degradable" and all of its grammatical variants (e.g., "degrade," "degradation," "degrading," and the like) refers to the dissolution or chemical conversion of materials into smaller components, intermediates, or end products by at least one of solubilization, hydrolytic degradation, biologically formed entities (e.g., bacteria or enzymes), chemical reactions, thermal reactions, or reactions induced by radiation. The term "at least a portion" with reference to degradation (e.g., "at least a portion of the body is degradable" or "at least a portion of the aqueous-degradable sealing element is degradable," and grammatical variants thereof) refers to degradation of at least about 80% of the volume of that part. In some instances, the degradation of the material may be sufficient for the mechanical properties of the material to reduce to a point that the material no longer maintains its integrity and, in essence, falls apart. The conditions for degradation are generally wellbore conditions where an external stimulus may be used to initiate or affect the rate of degradation. For example, the pH of the fluid that interacts with the material may be changed by introduction of an acid or a base. The term "wellbore environment" includes both naturally occurring wellbore environments and introduced materials into the wellbore.

Disclosed are various embodiments of a downhole tool including an aqueous-degradable sealing element capable of fluidly sealing two sections of a wellbore (which may be also referred to as "setting" the downhole tool). The downhole tool may have various setting mechanisms for fluidly sealing the sections of the wellbore with the sealing element including, but not limited to, hydraulic setting, mechanical setting, setting by swelling, setting by inflation, and the like. The downhole tool may be a well isolation device, such as a frac plug, a bridge plug, or a packer, a wiper plug, a cement plug, or any other tool requiring a sealing element for use in a downhole operation. Such downhole operations may include, but are not limited to, any type of fluid injection operation (e.g., a stimulation/fracturing operation, a pinpoint acid stimulation, casing repair, and the like), and the like. In some embodiments, the downhole tool may comprise a body and at least one aqueous-degradable sealing element composed of a thermoplastic rubber copolymer. The aqueous-degradable sealing element may degrade in a wellbore environment, such as upon contact with an aqueous fluid therein. As discussed in detail below, degradation of the aqueous-degradable sealing element may be accelerated, rapid, or normal, degrading anywhere from about 2 hours to about 120 days from first contact with an aqueous fluid, for example.

In some embodiments, at least a portion of the body itself may also be degradable upon exposure to the wellbore environment. The embodiments herein permit fluid sealing of two wellbore sections with a downhole tool having an aqueous-degradable sealing element that later degrades in situ, preferably without the need to mill or drill, and retrieve the downhole tool from the wellbore. In particular, the degradation of the aqueous-degradable sealing element results in failure of the sealing element to maintain differential pressure and form an effective seal. In such cases, the downhole tool may drop into a rathole in the wellbore without the need for retrieval or may be sufficiently degraded in the wellbore so as to be generally indiscernible. It will be appreciated by one of skill in the art that while the embodiments herein are described with reference to a downhole tool, the aqueous-degradable sealing elements disclosed herein may be used with any wellbore operation equipment that may preferentially degrade upon exposure to aqueous fluids.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. For example, if the numerical value is "about 80%," then it can be 80%+/−5%, equivalent to 76% to 84%. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

Referring now to FIG. 1, illustrated is an exemplary well system 110 for a downhole tool 100. As depicted, a derrick 112 with a rig floor 114 is positioned on the earth's surface 105. A wellbore 120 is positioned below the derrick 112 and the rig floor 114 and extends into subterranean formation 115. As shown, the wellbore may be lined with casing 125 that is cemented into place with cement 127. It will be appreciated that although FIG. 1 depicts the wellbore 120 having a casing 125 being cemented into place with cement 127, the wellbore 120 may be wholly or partially cased and wholly or partially cemented (i.e., the casing wholly or partially spans the wellbore and may or may not be wholly or partially cemented in place), without departing from the scope of the present disclosure. Moreover, the wellbore 120 may be an open-hole wellbore. A tool string 118 extends from the derrick 112 and the rig floor 114 downwardly into the wellbore 120. The tool string 118 may be any mechanical connection to the surface, such as, for example, wireline, slickline, jointed pipe, or coiled tubing. As depicted, the tool string 118 suspends the downhole tool 100 for placement into the wellbore 120 at a desired location to perform a specific downhole operation. In some embodiments, the downhole tool 100 is connected to the tool string 118 via a means such as physical connection, or a connection using one or more components of the downhole tool 100 (e.g., slips, wedges, sealing element, and the like). As previously mentioned, the downhole tool 100 may be any type of wellbore zonal isolation device including, but not limited to, a frac plug, a bridge plug, a packer, a wiper plug, or a cement plug.

It will be appreciated by one of skill in the art that the well system 110 of FIG. 1 is merely one example of a wide variety of well systems in which the principles of the present disclosure may be utilized. Accordingly, it will be appreciated that the principles of this disclosure are not necessarily limited to any of the details of the depicted well system 110, or the various components thereof, depicted in the drawings or otherwise described herein. For example, it is not necessary in keeping with the principles of this disclosure for the wellbore 120 to include a generally vertical cased section. The well system 110 may equally be employed in vertical, horizontal, and/or deviated wellbores, without departing from the scope of the present disclosure. Furthermore, it is not necessary for a single downhole tool 100 to be suspended from the tool string 118.

In addition, it is not necessary for the downhole tool 100 to be lowered into the wellbore 120 using the derrick 112. Rather, any other type of device suitable for lowering the downhole tool 100 into the wellbore 120 for placement at a desired location may be utilized, without departing from the scope of the present disclosure such as, for example, mobile workover rigs, well servicing units, and the like. Although not depicted, the downhole tool 100 may alternatively be hydraulically pumped into the wellbore and, thus, not need the tool string 118 for delivery into the wellbore 120.

Although not depicted, the structure of the downhole tool 100 may take on a variety of forms to provide fluid sealing between two wellbore sections. The downhole tool 100, regardless of its specific structure as a specific type of wellbore zonal isolation device, comprises a body and a sealing element. Both the body and the sealing element may each be composed of the same material. Generally, however, the body provides structural rigidity and other mechanical features to the downhole tool 100 and the sealing element is a resilient (i.e., elastic) material capable of providing a fluid seal between two sections of the wellbore 120.

Figure 2:
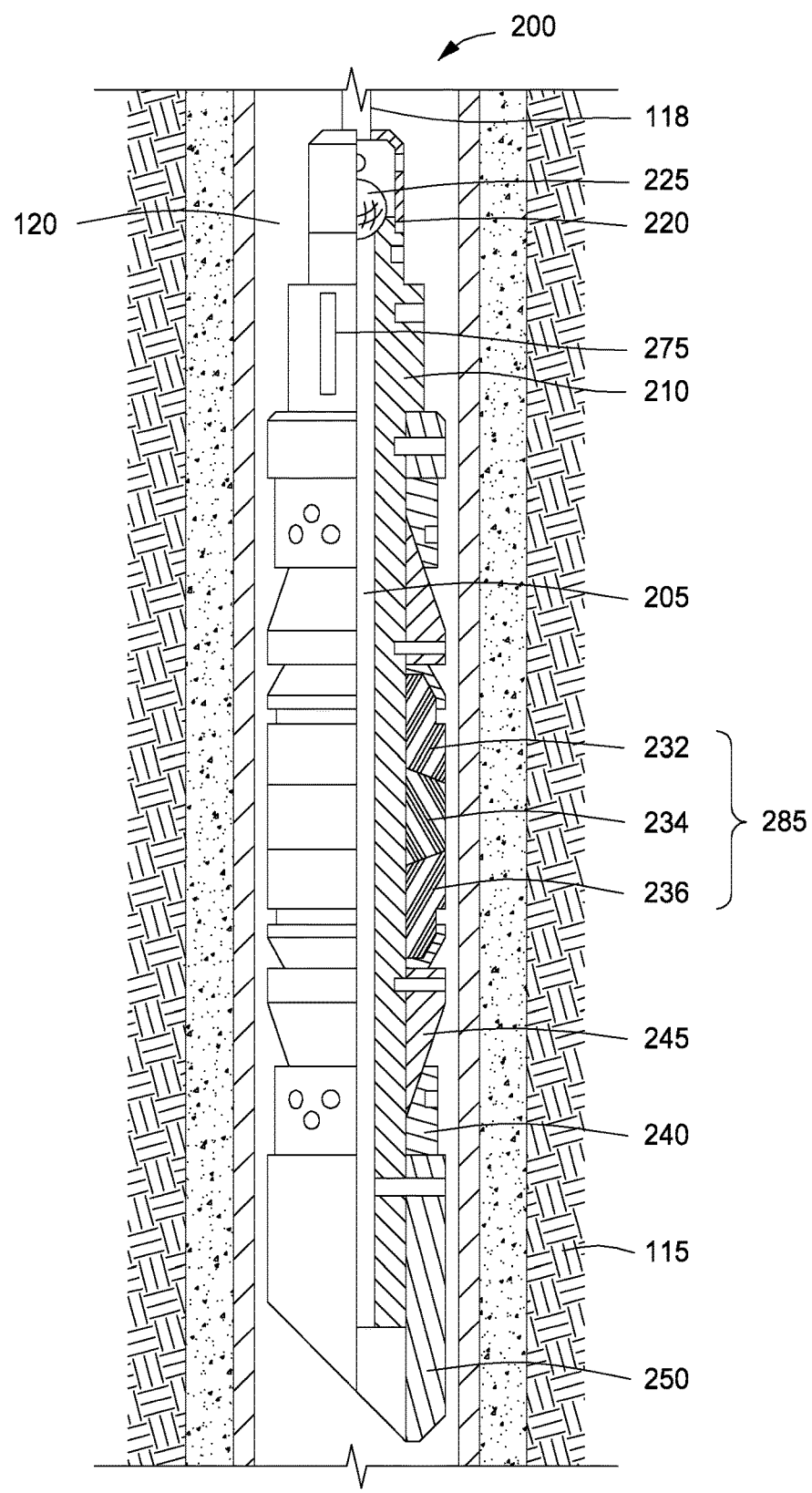
FIG. 2 depicts an enlarged cross-sectional view of a downhole tool, according to one or more embodiments described herein.

Referring now to FIG. 2, with continued reference to FIG. 1, one specific type of downhole tool described herein is a frac plug wellbore zonal isolation device for use during a well stimulation/fracturing operation. FIG. 2 illustrates a cross-sectional view of an exemplary frac plug 200 being lowered into a wellbore 120 on a tool string 118. As previously mentioned, the frac plug 200 generally comprises a body 210 and a sealing element 285. In some embodiments, the sealing element 285 may be resilient and have a Shore A durometer hardness in an amount of from about 60 to about 100, encompassing any value and subset therebetween. For example, the sealing element 285 may have a Shore A durometer hardness in an amount of from about 70 to about 90, or of from about 70 to about 80, or from about 75 to about 85, encompassing any value and subset therebetween. For example, in some embodiments, the sealing element 285 may be resilient and have a Shore A durometer hardness of from about 75 to about 95. Each of these values is critical to the embodiments of the present disclosure and may depend on a number of factors including, but not limited to, the material selected to form the sealing element 285, the operation to be performed by the downhole tool 100 (FIG. 1), the type of downhole tool 100, and the like.

The sealing element 285, as depicted, comprises an upper sealing element 232, a center sealing element 234, and a lower sealing element 236. It will be appreciated that although the sealing element 285 is shown as having three portions (i.e., the upper sealing element 232, the center sealing element 234, and the lower sealing element 236), any other number of portions, or a single portion, may also be employed without departing from the scope of the present disclosure.

As depicted, the sealing element 285 is extending around the body 210; however, it may be of any other configuration suitable for allowing the sealing element 285 to form a fluid seal in the wellbore 120, without departing from the scope of the present disclosure. For example, in some embodiments, the body may comprise two sections joined together by the sealing element, such that the two sections of the body compress to permit the sealing element to make a fluid seal in the wellbore 120 (i.e., a compression set downhole tool). Other such configurations are also suitable for use in the embodiments described herein. Moreover, although the sealing element 285 is depicted as located in a center section of the body 210, it will be appreciated that it may be located at any location along the length of the body 210, without departing from the scope of the present disclosure.

The body 210 of the frac plug 200 comprises an axial flowbore 205 extending therethrough. A cage 220 is formed at the upper end of the body 210 for retaining a ball 225 that acts as a one-way check valve. In particular, the ball 225 seals off the flowbore 205 to prevent flow downwardly therethrough, but permits flow upwardly through the flowbore 205. One or more slips 240 are mounted around the body 210 below the sealing element 285. The slips 240 are guided by a mechanical slip body 245. A tapered shoe 250 is provided at the lower end of the body 210 for guiding and protecting the frac plug 200 as it is lowered into the wellbore 120. An optional enclosure 275 for storing a chemical solution may also be mounted on the body 210 or may be formed integrally therein. In one embodiment, the enclosure 275 is formed of a frangible material.

At least a portion of the body 210 and the sealing element 285 may be composed of a degradable material. Specifically, the sealing element 285 may be at least partially composed of an aqueous-degradable thermoplastic rubber copolymer, as described in detail below that hydrolytically degrades, at least in part, in the presence of an aqueous fluid, such as preexisting aqueous fluids or introduced aqueous fluids in a wellbore environment. As used herein, the term "hydrolytic degradation" refers to the degradation of a material by cleavage of chemical bonds in the presence (e.g., by the addition of) an aqueous fluid. That is, the aqueous-degradable thermoplastic rubber copolymer forming at least a portion of the sealing element 285 may wholly degrade or partially degrade; however, the amount of degradation is capable of causing the sealing element 285 to no longer maintain a fluid seal in the wellbore capable of maintaining differential pressure. The aqueous fluid that may degrade the aqueous-degradable thermoplastic rubber copolymer may include, but is not limited to, fresh water, saltwater (e.g., water containing one or more salts dissolved therein), brine (e.g., saturated salt water), seawater, produced water, wastewater (either treated or untreated), or combinations thereof.

The hydrolytic degradation of the aqueous-degradable thermoplastic rubber copolymer forming at least a portion of the sealing element 285 and/or the degradation of any degradable portion of the body 210 may be by a number of mechanisms. For example, the degradation may be by swelling, dissolving, undergoing a chemical change, undergoing thermal degradation in combination with any of the foregoing, and any combination thereof. Degradation by swell involves the absorption by the aqueous-degradable thermoplastic rubber copolymer or other degradable material of a fluid (e.g., an aqueous fluid) in the wellbore environment such that the mechanical properties of the thermoplastic rubber copolymer or material degrade. That is, the aqueous-degradable thermoplastic rubber copolymer or degradable material continues to absorb the fluid until its mechanical properties are no longer capable of maintaining the integrity of the aqueous-degradable thermoplastic rubber copolymer or degradable material and it at least partially falls apart. In some embodiments, the aqueous-degradable thermoplastic rubber copolymer or other degradable material may be designed to only partially degrade by swelling in order to ensure that the mechanical properties of the sealing element 285 and/or body 210 formed from the aqueous-degradable thermoplastic rubber copolymer or other degradable material is sufficiently capable of lasting for the duration of the specific operation in which it is utilized (e.g., of maintaining a seal). Degradation by dissolving involves use of an aqueous-degradable thermoplastic rubber copolymer or other degradable material that is soluble or otherwise susceptible to fluids (e.g., aqueous fluids), such that the fluid is not necessarily incorporated into the aqueous-degradable thermoplastic rubber copolymer or degradable material (as is the case with degradation by swelling), but becomes soluble upon contact with the fluid. Degradation by undergoing a chemical change may involve breaking the bonds of the backbone of the aqueous-degradable thermoplastic rubber copolymer (e.g., polymer backbone) or degradable material, or causing the bonds of the aqueous-degradable thermoplastic rubber copolymer or degradable material to crosslink, such that it becomes brittle and breaks into small pieces upon contact with even small forces expected in the wellbore environment. Thermal degradation involves a chemical decomposition due to heat, such as the heat present in a wellbore environment. Thermal degradation of some aqueous-degradable thermoplastic rubber copolymer and/or degradable material described herein may occur at wellbore environment temperatures of greater than about 50° C. (or about 120° F.). Thermal degradation may work in concert with one or more of the other degradation methods described herein. Additionally, combinations of any of these degradation methods may occur for any given aqueous-degradable thermoplastic rubber copolymer and/or degradable material for use in forming all or a portion of the downhole tools described herein.

The degradation rate of the aqueous-degradable thermoplastic rubber copolymer forming the sealing element 285 may be accelerated, rapid, or normal, as defined herein. Rapid degradation may be in the range of from about 2 hours to about 36 hours, encompassing any value or subset therebetween. Normal degradation may be in the range of from about 36 hours to about 14 days, encompassing any value or subset therebetween. Extended degradation may be in the range of from about 14 days to about 120 days, encompassing any value or subset therebetween. Accordingly, the degradation may be of from about 120 minutes to about 120 days, or about 2 hours to about 36 hours, or about 36 hours to about 14 days, or about 14 days to about 120 days, encompassing any value and subset therebetween. Each of these values is critical and depend on a number of factors including, but not limited to, the type of aqueous-degradable thermoplastic rubber copolymer selected, the conditions of the wellbore environment, the amount of contact with an aqueous fluid, and the like.

The aqueous-degradable thermoplastic rubber copolymer forming at least a portion of the sealing element 285 is a copolymer comprising a thermoplastic component and a rubber component. The aqueous-degradable thermoplastic rubber copolymer thus exhibits plastic properties and rubber properties. The thermoplastic component of the aqueous-degradable thermoplastic rubber copolymer imparts strength and degradability (e.g., by the means discussed above) to the sealing element 285, and the rubber component of the aqueous-degradable thermoplastic rubber copolymer imparts flexibility and elasticity to the sealing element 285, as well as influencing the rate of degradation thereof. Accordingly, the thermoplastic and rubber components of the aqueous-degradable thermoplastic rubber copolymer work synergistically together to provide all of functionality, toughness, and degradability to the sealing element 285.

The amount of thermoplastic component in the aqueous-degradable thermoplastic rubber copolymer is in the range of about 5% to about 95% by weight of the aqueous-degradable thermoplastic rubber copolymer, encompassing any value and subset therebetween. For example, the amount of thermoplastic component is in the range of about 5% to about 20%, or about 20% to about 35%, or about 35% to about 50%, or about 50% to about 65%, or about 65% to about 80%, or about 80% to about 95%, or about 20% to about 80%, or about 35% to about 65%, encompassing any value and subset therebetween. In other embodiments, the ratio of the thermoplastic component to the rubber component is in the range of about 10:1 to about 1:10, encompassing any value and subset therebetween. Each of these values is critical to the embodiments of the embodiments described herein and depend on a number of factors including, but not limited to, the type of thermoplastic component selected, the type of rubber component selected, the type of aqueous fluid contacting the aqueous-degradable thermoplastic rubber copolymer, the wellbore environment, and the like.

In preferred embodiments, the amount of thermoplastic component in the aqueous degradable thermoplastic rubber copolymer is greater than about 50%, about 60%, about 70%, about 80%, about 90%, up to about 95% by weight of the aqueous-degradable thermoplastic rubber copolymer, encompassing any value and subset therebetween. In another preferred embodiment, the amount of thermoplastic component in the aqueous degradable thermoplastic rubber copolymer is in the range of about 70% to about 90% by weight of the aqueous-degradable thermoplastic rubber copolymer, encompassing any value and subset therebetween, including about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, and about 90%. These preferred embodiments rely on a higher ratio of the thermoplastic component compared to the rubber component, which ensures that the aqueous-degradable thermoplastic rubber copolymer will degrade in a typical wellbore environment.

The aqueous-degradable thermoplastic rubber copolymer of the present disclosure can have dispersed rubber phases, dispersed thermoplastic phases, or continuous phases of both the rubber and the thermoplastic. The variation in the phases depends on the relative amount of the material that is used, as well as the time and shear stress used during the blending. In preferred embodiments, the thermoplastic phase is continuous and the rubber phase is dispersed, where the dispersed rubber phase droplets have a diameter in the range of about 0.2 micrometers (μm) to about 5 millimeters (mm), encompassing any value and subset therebetween. For example, the dispersed rubber phase droplets can have a diameter of about 0.2 μm to about 1 μm, or about 1 μm to about 500 μm, or about 500 μm to about 1 mm, or about 1 mm to about 1.5 mm, or about 1.5 mm to about 2 mm, or about 2 mm to about 2.5 mm, or about 2.5 mm to about 3 mm, or about 3 mm to about 3.5 mm, or about 3.5 mm to about 4 mm, or about 4 mm to about 4.5 mm, or about 4.5 mm to about 5 mm, encompassing any value and subset therebetween. Each of these values is critical to the embodiments of the present disclosure and depend on a number of factors including, but not limited to, the type of components selected for forming the aqueous-degradable thermoplastic rubber copolymer, the ratio of the two components of the aqueous-degradable thermoplastic rubber copolymer, and the like, and any combination thereof. In other embodiments, the aqueous-degradable thermoplastic rubber copolymer has both a continuous rubber phase and a continuous thermoplastic phase. That is, two separate phases are apparent and neither form droplets within the other.

The thermoplastic component of the aqueous-degradable thermoplastic rubber copolymer disclosed herein is an aliphatic polyester. An "aliphatic polyester" is an open chained polymer containing an ester functional group in its main polymer chain. The aliphatic polyesters for use as the thermoplastic component of the aqueous-degradable thermoplastic rubber copolymers described herein can be saturated (i.e., joined by single bonds) or unsaturated (i.e., having double or triple bonds), without departing from the scope of the present disclosure. The ester functional group of the aliphatic polyester hydrolyzes in the presence of water, thus imparting their degradable characteristic.

Examples of suitable aliphatic polyesters for use as the thermoplastic component of the aqueous-degradable thermoplastic rubber copolymer described herein include, but are not limited to, a polylactic acid (PLA), a polyglycolic acid (PGA), a polycaprolactone (PCL), a polyhydroxyalkonate (PHA), any derivative thereof, and any combination thereof. Other suitable aliphatic polyesters for use as the thermoplastic component of the aqueous-degradable thermoplastic rubber copolymer include, but are not limited to, polybutylene succinate, polyhydroxyalkanoiate, polyhydroxybutyrate, polyethylene adipate, poly(3-hydroxybutyrate-co-3-hydroxyvalerate, any derivative thereof, and any combination thereof. The term "derivative" is defined herein any compound that is made from one of the listed compounds, for example, by replacing one atom in one of the listed compounds with another atom or group of atoms, ionizing one of the listed compounds, forming a copolymer therewith, or creating a salt of one of the listed compounds.

The PLA may be derived from any source, such as a renewable source including corn starch, tapioca (roots, chips, or starch), sugarcane, and the like. Additionally, chiral forms of PLA are also suitable, such as poly-L-lactide (PLLA), a semi-crystalline product resulting from polymerization of L,L-lactide. Amorphous poly-DL-lactide (PDLLA) is also suitable as an aliphatic polyester for use as the thermoplastic component of the aqueous-degradable thermoplastic rubber copolymer, formed from the polymerization of a racemic mixture of L-lactide and D-lactide. PLA and its various forms (e.g., PLLA, PDLLA) are collectively referred to herein as "PLA," unless specified otherwise. Generally, it is preferred that the selected PLA have a relatively low level of crystallinity to promote the desired degradation. In some embodiments, the PLA has a crystallinity of less than about 40%, including a crystallinity of 0% and encompassing any value and subset therebetween. Examples of suitable commercially available PLA for use as the thermoplastic component of the aqueous-degradable thermoplastic rubber copolymer of the present disclosure include, but are not limited to INGEO™ Biopolymer 3001D and INGEO™ 4042D Film Grade PLA, both available from NatureWorks LLC in Minnetonka, Minn.

The PGA may be formed from a polycondensation or ring-opening polymerization of glycolic acid. Additionally, suitable PGA includes its copolymer with lactic acid, poly (lactic-co-glycolic acid) (PLDA), as well as poly(glycolide-co-caprolactone) and poly(glycolide-co-trimethylene carbonate). PGA and its various forms (e.g., copolymer forms) are collectively referred to herein as "PGA," unless specified otherwise. Generally, it is preferred that the selected PGA has a relatively low level of crystallinity to promote the desired degradation. In some embodiments, the PGA has a crystallinity of less than about 60%, including a crystallinity of 0% and encompassing any value and subset therebetween.

The PCL may be formed by a ring-opening polymerization of ε-caprolactone in the presence of a catalyst (e.g., stannous octoate). Examples of suitable commercially available PCL for use as the thermoplastic component of the aqueous-degradable thermoplastic rubber copolymer described herein include, but are not limited to, CAPA® polycaprolactones available from Solvay S.A. in Brussels, Belgium; TOME™ polycaprolactones available from Union Carbide Corp. in Houston, Tex.; and CELGREEN polycaprolactones available from Diacel Chemical Industries, Ltd. in Osaka, Japan.

The PHA may be formed by bacterial fermentation of sugars and/or lipids. The type of PHA may be poly(HA)SCL or poly(HA)MCL depending on the hydroxyl fatty acid chain length (short or medium chain length, respectively) of the PHA synthase. PHA and its various forms (e.g., poly (HA)SCL, poly(HA)MCL) are collectively referred to herein as "PHA," unless specified otherwise. An example of a suitable commercially available PHA for use as the thermoplastic component of the aqueous-degradable thermoplastic rubber copolymer of the present disclosure includes, but is not limited to, NODAX™, available from Procter & Gamble Co. in Cincinnati, Ohio.

Regardless of the thermoplastic component type selected for forming the aqueous-degradable thermoplastic rubber copolymer, the thermoplastic component has a degradation rate of about 0.01 millimeters per hour (mm/hr) to about 2 mm/hr in fresh water (e.g., tap water) at a temperature in the range of about 120° F. to about 250° F. (248° C. to 482° C.), encompassing any value and subset therebetween. In some embodiments, the thermoplastic component can have a degradation rate of 0.01 mm/hr to 0.1 mm/hr, or about 0.1 mm/hr to about 0.5 mm/hr, or about 0.5 mm/hr to about 1 mm/hr, or about 1 mm/hr to about 1.5 mm/hr, or about 1.5 mm/hr to about 2 mm/hr in fresh water (e.g., tap water) at a temperature in the range of about 120° F. to about 250° F. (248° C. to 482° C.), encompassing any value and subset therebetween. As specific examples, the thermoplastic component has a degradation rate of about 0.01 mm/hr to 2 mm/hr in fresh water (e.g., tap water) at 120° F., at 180° F., and at 250° F., encompassing any value and subset therebetween.

The rubber component of the aqueous-degradable thermoplastic rubber copolymer is a polyurethane-based rubber, a natural rubber, a rubber-modified polystyrene (HIPS), an acrylic rubber, and any combination thereof. Examples of commercially available rubber components include, but are not limited to ELASTOLLAN® 85A polyurethane, available from BASF Corporation in Ludwigshafen, Germany; IROGRAN® H Series polyurethane, available from Huntsman Corporation in The Woodlands, Tex.; and HYTEMP® acrylic rubber, available from Zeon Corporation in Tokyo, Japan.

When the selected rubber component is a natural rubber, in preferred embodiments about 25% to about 50% of the unsaturation of the natural rubber is functionalized with epoxy groups. Such functionalization can enhance the flexibility and elasticity of the rubber component, and thus the aqueous-degradable thermoplastic rubber copolymer as a whole.

In preferred embodiments, the rubber component is a polyurethane-based rubber, which can be either aliphatic or aromatic, without departing from the scope of the present disclosure. Polyurethane-based rubbers traditionally are formed by reacting a polyisocyanate (include diisocyanate) with a polyol. In the embodiments described herein, although non-limiting, the polyol for forming a polyurethane-based rubber may be a natural oil polyol, an ester polyol, a polyester polyol (e.g., polybutadienes (e.g., polybutanediol adipate), polycaprolactones, polycarbonates, and the like), or a polyether polyol (e.g., polytetramethylene ether glycol, polyoxypropylene-glycol, polyoxyethylene glycol, and the like). Suitable polyurethane-based rubbers include, but are not limited to, thermoplastic polyurethane rubbers, polyethane polyurethane rubbers, polyester-based polyurethanes rubbers (e.g., lactone polyester-based thermoplastic polyurethanes), polyether-based polyurethane rubbers, and any combination thereof.

In some embodiments, where the aqueous-degradable thermoplastic rubber copolymer selected has a polyurethane-based rubber as the rubber component for use in forming the sealing element 285, the inclusion of a low functionality initiator may impart flexibility to the sealing element 285. Such low functionality initiators may include, but are not limited to dipropylene glycol, glycerine, sorbitol/ water solution, and any combination thereof. As used herein, the term "low functionality initiator," and grammatical variants thereof, refers to the average number of isocyanate reactive sites per molecule in the range of from about 1 to about 5, encompassing any value and subset therebetween. For example, the average number of isocyanate reactive sites per molecule may be of from about 1 to about 3, or about 3 to about 5, encompassing any value and subset therebetween. These low functionality initiators impart flexibility to the sealing element 285 and may be included in the polyurethane-based rubber components described herein in an amount in the range of from about 1% to about 50% by weight of the polyol in the polyurethane-based rubber, encompassing any value and subset therebetween. For example, the polyurethane-based rubber components described herein in an amount in the range of from about 1% to about 10%, or about 10% to about 25%, or about 25% to about 35%, or about 35% to about 50% by weight of the polyol in the polyurethane-based rubber, encompassing any value and subset therebetween.

Additionally, in some embodiments, higher molecular weight polyols for use in forming the polyurethane-based rubbers described herein may impart flexibility to the sealing element 285 described herein. For example, in some embodiments, the molecular weight of the selected polyols may be in the range of from about 200 Daltons (Da) to about 20000 Da, encompassing any value and subset therebetween. For example, the molecular weight of the selected polyols may be in the range of from about 200 Da to about 5000 Da, or about 5000 Da to about 10000 Da, or about 10000 Da to about 15000 Da, or about 15000 Da to about 20000 Da, encompassing any value and subset therebetween. Each of these values is critical to the embodiments described herein and may depend on a number of factors including, but not limited to, the desired flexibility of the aqueous-degradable thermoplastic rubber copolymer (and thus, e.g., the sealing element 285), the type of subterranean formation operation being performed, the wellbore conditions in the subterranean formation, and the like.

The selection of the thermoplastic component and the rubber component is based on the desired characteristics of the resultant aqueous-degradable thermoplastic rubber copolymer, such as degradation rate, elasticity and flexibility, component availability, and the like. In some embodiments, it is desirable that the selected thermoplastic component and the selected rubber component have similar melt indices, such that the two components can be easily compounded together under similar conditions, thus resulting in a stable aqueous-degradable thermoplastic rubber copolymer.

In some embodiments, additional additives may be included in the aqueous-degradable thermoplastic rubber copolymer to enhance the degradability, flexibility of the copolymer, tensile strength, storage moduli, and/or permeability of the aqueous-degradable thermoplastic rubber copolymer, and thus the sealing element 285. In some embodiments, for example, the aqueous-degradable thermoplastic rubber copolymer may comprise a plasticizer, a starch, a polymer (e.g., an elastomer, a water-soluble polymer, a rubbery polymer, and the like), an organophilic clay, silica, a metal oxide, carbon black, and any combination thereof. Generally, such additives are included in the component in which they are designed to impart desired characteristics, and in such cases, they contribute to the ratio of the two components as described above. For example, the additive may be a water-soluble polymer included in the thermoplastic component for enhancing degradability and in such cases, the combination of the thermoplastic and the water-soluble polymer together form the thermoplastic component. In other embodiments, the additive is evenly distributed throughout both the thermoplastic component and the rubber component, without departing from the scope of the present disclosure.

Examples of suitable plasticizers that may be included in the aqueous-degradable thermoplastic rubber copolymer include, but are not limited to, tributyl acetyl citrate, tributyl citrate, triethyl-2-acetyl citrate, glyceryl triacetate, oligomeric acid, citrate ester, low molecular weight polyethylene glycol (having a molecular weight of less than 60 Daltons), and any combination thereof. Examples of suitable starches that may be included in the aqueous-degradable thermoplastic rubber copolymer include, but are not limited to, starch-poly(ethylene-co-vinyl alcohol), starch-polyvinyl alcohol, starch-polylactic acid, starch-polycaprolactone, starch-poly (butylene succinate), and any combination thereof. Examples of suitable polymers that may be included in the aqueous-degradable thermoplastic rubber copolymer include, but are not limited to polyvinyl alcohol (a water-soluble polymer), polyvinyl acetate (a rubbery polymer), polyethylene oxide (a water-soluble polymer), polypropylene oxide (a water-soluble polymer), and any combination thereof.

Generally, the additive may be included in an amount in the range of from about 1% to about 80% by weight of the component of the aqueous-degradable thermoplastic rubber copolymer when included in a specific component, or by weight of the aqueous-degradable thermoplastic rubber copolymer when distributed throughout the thermoplastic component and the rubber component, encompassing any value and subset therebetween. Accordingly, the additive may be included in an amount of from about 1% to about 16%, or about 16% to about 32%, or about 32% to about 48%, or about 48% to about 64%, or about 64% to about 80% by weight of the component of the aqueous-degradable thermoplastic rubber copolymer when included in a specific component, or by weight of the aqueous-degradable thermoplastic rubber copolymer when distributed throughout the thermoplastic component and the rubber component, encompassing any value and subset therebetween. In preferred embodiments, the additive may be included in an amount in the range of from about 5% to about 40% by weight of the component of the aqueous-degradable thermoplastic rubber copolymer when included in a specific component, or by weight of the aqueous-degradable thermoplastic rubber copolymer when distributed throughout the thermoplastic component and the rubber component, encompassing any value and subset therebetween. Each of these values is critical to the embodiments described herein and depends on a number of factors including, but not limited to, the desired flexibility of the aqueous-degradable thermoplastic rubber copolymer, the desired degradation rate of the aqueous-degradable thermoplastic rubber copolymer, the wellbore conditions of the subterranean formation, the subterranean formation operation being performed, and the like.

In a specific example, the aqueous-degradable thermoplastic rubber copolymer comprises 80% thermoplastic component of a mixture of polylactic acid and polyvinyl alcohol, and 20% rubber component that is a thermoplastic polyurethane formed by reacting a diisocyanate and an ester polyol, with chain extenders. In some embodiments, the mixture of the polylactic acid and the polyvinyl alcohol comprises about 10% to about 90% of polyvinyl alcohol by weight of the total thermoplastic component, encompassing any value and subset therebetween, such as about 10% to about 26%, or about 26% to about 42%, or about 42% to about 58%, or about 58% to about 74%, or about 74% to about 90% by weight of the total thermoplastic component. In preferred embodiments, the mixture of the polylactic acid and the polyvinyl alcohol comprises about 30% to about 60% of polyvinyl alcohol by weight of the total thermoplastic component, encompassing any value and subset therebetween. Each of these values is critical to the embodiments of the present disclosure and depends on a number of factors including, but not limited to, the desired characteristic(s) of the aqueous-degradable thermoplastic rubber copolymer (e.g., flexibility, elasticity, and the like), the wellbore environment into which it is to be placed, the desired degradability time and environment, and the like.

As used herein, the term "chain extender," and grammatical variants thereof, refers to low molecular weight hydroxyl and amine terminated compounds that contribute to polymer morphology. Examples of suitable chain extenders include, but are not limited to, ethylene glycol, 1,4-butanediol, 1,6-hexanediol, cyclohexane dimethanol, hydroquinone bis (2-hydroxyethyl) ether, and any combination thereof.

In some embodiments, the sealing element 285 may be at least partially encapsulated in a second material (e.g., a "sheath") formed from an encapsulating material capable of protecting or prolonging degradation of the sealing element 285 in a wellbore environment comprising an aqueous fluid (and any additional stimuli). As used herein, the term "at least partially encapsulated" with reference to an encapsulating material, means that at least 50% of an outer surface of a component of a downhole tool (i.e., the sealing element or a component of the body) is covered with the encapsulating material. The sheath may also serve to protect the sealing element 285 from abrasion within the wellbore 120. The structure of the sheath may be permeable, frangible, or of a material that is at least partially removable at a desired rate within the wellbore environment. Whatever the structure, the sheath is designed such that it does not interfere with the ability of the sealing element 285 to form a fluid seal in the wellbore 120. The encapsulating material forming the sheath may be any material capable of use in a downhole environment and, depending on the structure of the sheath may, or may not, be elastic such that it expands with the sealing element 285. For example, a frangible sheath may break as the sealing element 285 expands to form a fluid seal, whereas a permeable sheath may remain in place on the sealing element 285 as it forms the fluid seal. As used herein, the term "permeable" refers to a structure that permits fluids (including liquids and gases) therethrough and is not limited to any particular configuration.

The encapsulating material forming the sheath may be of any material that the sealing element 285 itself may be made of, as described above, including aqueous-degradable thermoplastic rubber copolymers with or without additives included therein, or any other aqueous-degradable material. For example, the sheath may be made of an aqueous-degradable material that degrades faster than the aqueous-degradable thermoplastic rubber copolymer forming the sealing element 285. Examples of suitable encapsulating materials may include, but are not limited to, a wax, a grease, a drying oil, a semi-drying oil, a crosslinked partially hydrolyzed polyacrylic, a silicate material, a glass material, an inorganic durable material, a polymer, a polylactic acid, a polyvinyl alcohol, a polyvinylidene chloride, and any combination thereof.

In some embodiments, as described above, the body 210, or a portion thereof, may also be composed of a degradable material, including the aqueous-degradable thermoplastic rubber copolymers described herein. Unlike the sealing element 285, however, the body 210 is sufficiently rigid to provide structural integrity to the downhole tool, or frac plug 200. The body 210 may degrade in the wellbore environment such as when exposed to an aqueous fluid, an elevated wellbore temperature, and/or a hydrocarbon fluid, or by any mechanism previously discussed. The aqueous fluid may be any aqueous fluid present in the wellbore environment including, but not limited to, those listed above: fresh water, saltwater, brine, seawater, produced water, waste water, or combinations thereof. The body 210 may thermally degrade in a wellbore environment having temperatures greater than about 93° C. (or about 200° F.). The body 210 may also degrade upon contact with a hydrocarbon fluid in the wellbore environment. In such cases, the hydrocarbon fluid may include, but is not limited to, alkanes, olefins, aromatic organic compounds, cyclic alkanes, paraffins, diesel fluids, mineral oils, desulfurized hydrogenated kerosenes, and any combination thereof. Suitable materials for forming the body 210 may include, but are not limited to, a polysaccharide, chitin, chitosan, a protein, an aliphatic polyester, poly (ε-caprolactone), a poly(hydroxybutyrate), poly(ethyleneoxide), poly(phenyllactide), a poly(amino acid), a poly (orthoester), polyphosphazene, a polylactide, a polyglycolide, a poly(anhydride) (e.g., poly(adipic anhydride), poly(suberic anhydride), poly(sebacic anhydride), poly(dodecanedioic anhydride), poly(maleic anhydride), and poly(benzoic anhydride), and the like), a polyepichlorohydrin, a copolymer of ethylene oxide/polyepichlorohydrin, a terpolymer of epichlorohydrin/ethylene oxide/allyl glycidyl ether, and any combination thereof. Suitable materials for forming the body 210 may also include, but are not limited to, metals or metal alloys that include magnesium, aluminum, iron, nickel, copper, gallium, zinc, zirconium, and the like, and any combination thereof. In some embodiments, metals or metal alloys comprising magnesium or aluminum may form the body 210 for degradation in a wellbore environment. Combinations of the foregoing polymers and metals/metal alloys may be used in forming the body 210.

In other embodiments, the body 210 is formed by a degradable metal material. Suitable degradable metal materials include, but are not limited to, tin, aluminum, aluminum alloys, zinc, magnesium, magnesium alloys, beryllium, any alloy of the aforementioned materials, and any combination thereof.

Suitable magnesium alloys include alloys having magnesium at a concentration in the range of from about 40% to about 99% by weight of the magnesium, encompassing any value and subset therebetween. In some embodiments, the magnesium concentration may be in the range of about 40% to about 99%, 70% to about 98%, and preferably about 80% to about 95% by weight of the magnesium alloy, encompassing any value and subset therebetween. Each of these values is critical to the embodiments of the present disclosure and may depend on a number of factors including, but not limited to, the type of magnesium alloy, the desired degradability of the magnesium alloy, and the like.

Magnesium alloys comprise at least one other ingredient besides the magnesium. The other ingredients can be selected from one or more metals, one or more non-metals, or a combination thereof. Suitable metals that may be alloyed with magnesium include, but are not limited to, lithium, sodium, potassium, rubidium, cesium, beryllium, calcium, strontium, barium, aluminum, gallium, indium, tin, thallium, lead, bismuth, scandium, titanium, vanadium, chromium, manganese, iron, cobalt, nickel, copper, zinc, yttrium, zirconium, niobium, molybdenum, ruthenium, rhodium, palladium, praseodymium, silver, lanthanum, hafnium, tantalum, tungsten, terbium, rhenium, osmium, iridium, platinum, gold, neodymium, gadolinium, erbium, oxides of any of the foregoing, and any combinations thereof.

Suitable non-metals that may be alloyed with magnesium include, but are not limited to, graphite, carbon, silicon, boron nitride, and combinations thereof. The carbon can be in the form of carbon particles, fibers, nanotubes, fullerenes, and any combination thereof. The graphite can be in the form of particles, fibers, graphene, and any combination thereof. The magnesium and its alloyed ingredient(s) may be in a solid solution and not in a partial solution or a compound where inter-granular inclusions may be present. In some embodiments, the magnesium and its alloyed ingredient(s) may be uniformly distributed throughout the magnesium alloy but, as will be appreciated, some minor variations in the distribution of particles of the magnesium and its alloyed ingredient(s) can occur. In other embodiments, the magnesium alloy is a sintered construction.

Suitable aluminum alloys include alloys having aluminum at a concentration in the range of from about 40% to about 99% by weight of the aluminum alloy, encompassing any value and subset therebetween. For example, suitable magnesium alloys may have aluminum concentrations of about 40% to about 50%, or about 50% to about 60%, or about 60% to about 70%, or about 70% to about 80%, or about 80% to about 90%, or about 90% to about 99% by weight of the aluminum alloy, encompassing any value and subset therebetween. Each of these values is critical to the embodiments of the present disclosure and may depend on a number of factors including, but not limited to, the type of aluminum alloy, the desired degradability of the aluminum alloy, and the like.

The aluminum alloys may be wrought or cast aluminum alloys and comprise at least one other ingredient besides the aluminum. The other ingredients can be selected from one or more any of the metals, non-metals, and combinations thereof described above with reference to magnesium alloys, with the addition of the aluminum alloys additionally being able to comprise magnesium.

Suitable degradable metal materials for use in forming the body 210 described herein also include micro-galvanic metals or materials, such as solution-structured galvanic materials. An example of a solution-structured galvanic material is a magnesium alloy containing zinc (Zn), where different domains within the alloy contain different percentages of Zn. This leads to a galvanic coupling between these different domains, which causes micro-galvanic corrosion and degradation. Micro-galvanically corrodible magnesium alloys could also be solution structured with other elements such as zinc, aluminum, manganese, nickel, cobalt, calcium, iron, carbon, tin, silver, copper, titanium, rare earth elements, etc. Examples of solution-structured micro-galvanically-corrodible magnesium alloys include ZK60, which includes about 4% to about 7% zinc, about 0.2% zirconium, 0% to about 5% other, and balance magnesium; AZ80, which includes about 7% to about 10% aluminum, about 0.2% to about 0.8% zinc, about 0.1% manganese, 0% to about 5% other, and balance magnesium; and AZ31, which includes about 2% to about 4% aluminum, about 0.5% to about 2% zinc, about 0.2% manganese, about 0% to about 5% other, and the balance magnesium. Each of these examples is % by weight of the metal alloy. In some embodiments, "other" may include unknown materials, impurities, additives, and any combination thereof.

In some embodiments, the body 210 may release an accelerant during degradation that accelerates the degradation of the sealing element 285. In other embodiments, the sealing element 285 may release an accelerant that accelerates the degradation of the body 210. In some cases, the accelerant is a natural component that is released upon degradation of either the body 210 or the sealing element 285, such as an acid (e.g., release of an acid upon degradation of the body 210 formed from PLA). Similarly, the body 210 may release a base that would aid in degrading the sealing element 285, such as, for example, if the body 210 were composed of a galvanically reacting material. In other cases, the accelerant may be embedded in the material forming either or both of the body 210 and the sealing element 285. The accelerant may be in any form, including a solid or a liquid.

Suitable accelerants may include, but are not limited to, a crosslinker, sulfur, a sulfur releasing agent, a peroxide, a peroxide releasing agent, a catalyst, an acid releasing agent, a base releasing agent, and any combination thereof. In some embodiments, the accelerant may cause the body 210 or the sealing element 285 to become brittle to aid in degradation. Specific accelerants may include, but are not limited to, a polylactide, a polyglycolide, an ester, a cyclic ester, a diester, an anhydride, a lactone, an amide, an anhydride, an alkali metal alkoxide, a carbonate, a bicarbonate, an alcohol, an alkali metal hydroxide, ammonium hydroxide, sodium hydroxide, potassium hydroxide, an amine, an alkanol amine, an inorganic acid or precursor thereof (e.g., hydrochloric acid, hydrofluoric acid, ammonium bifluoride, and the like), an organic acid or precursor thereof (e.g., formic acid, acetic acid, lactic acid, glycolic acid, aminopolycarboxylic acid, polyaminopolycarboxylic acid, and the like), and any combination thereof.

The accelerant, when embedded in the body 210 or the sealing element 285, may be present in the range of from about 0.01% to about 25% by weight of the material forming the body 210 or the sealing element 285. For example, the accelerant may be present of from about 0.01% to about 5%, or about 5% to about 10%, or about 10% to about 25% by weight of the material forming the body 210 or the sealing element 285, encompassing any value and subset therebetween. Each of these values is critical to the embodiments of the present disclosure and may depend on a number of factors including, but not limited to, the material forming the body 210 and/or the sealing element 285, the desired degradation rate of the body 210 and/or the sealing element 285, and the like, and any combination thereof.

Each of the individual components forming the body 210 and the sealing element 285 (i.e., the primary material and any additional material embedded therein) is preferably present in the body 210 and the sealing element 285 uniformly (i.e., distributed uniformly throughout each component). The choices and relative amounts of each component are adjusted for the particular downhole operation (e.g., fracturing, workover, and the like) and the desired degradation rate (i.e., accelerated, rapid, or normal) of the body 210 and/or sealing element 285. Factors that may affect the selection and amount of components may include, for example, the temperature of the subterranean formation in which the downhole operation is being performed, the expected amount of aqueous and/or hydrocarbon fluid in the wellbore environment, the amount of elasticity required for the sealing element 285 (e.g., based on wellbore diameter, for example), the duration of the downhole operation, and the like.

Figure 3:
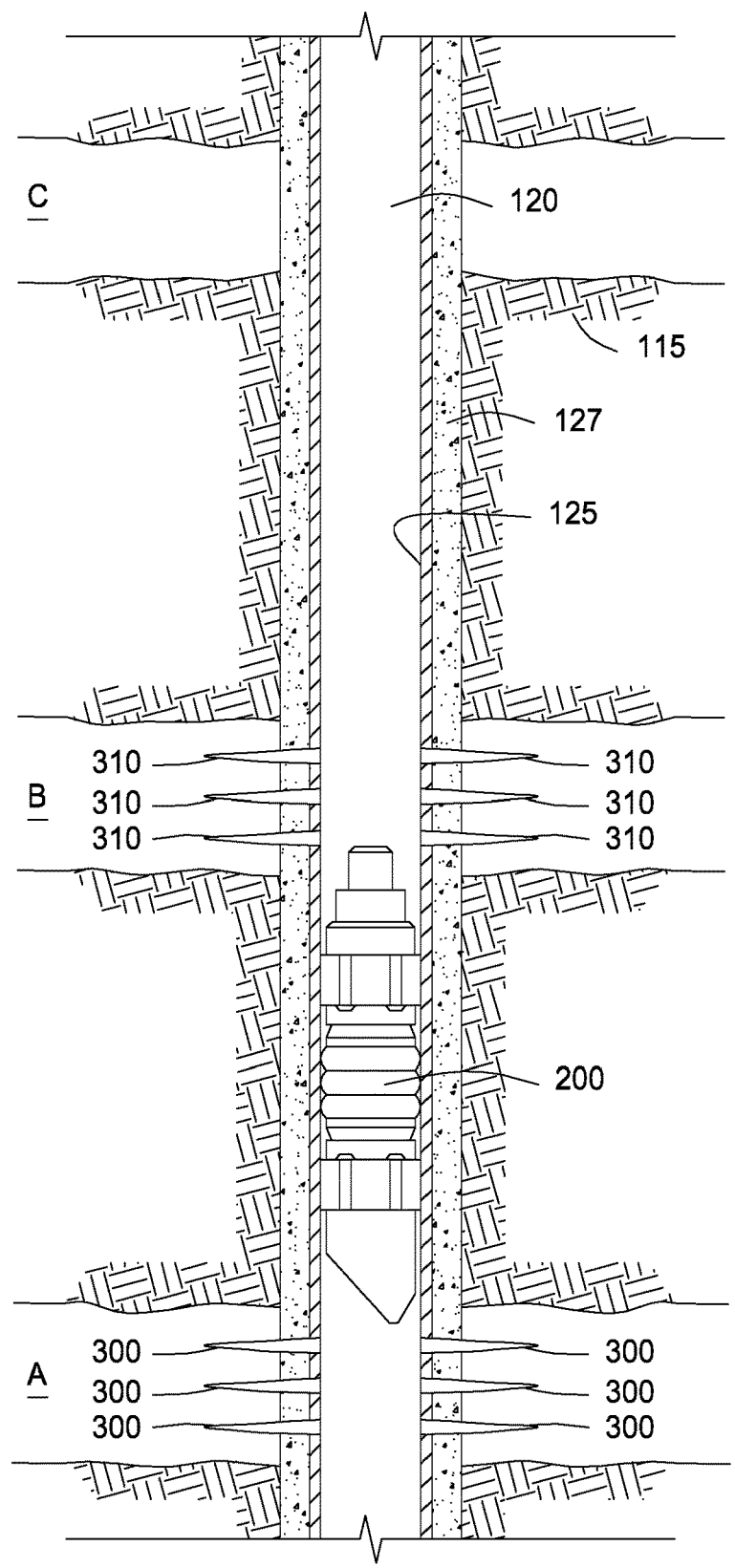
FIG. 3 shows an enlarged cross-sectional view of a downhole tool in operation, according to one or more embodiments described herein.

Referring again to FIG. 2, in operation the frac plug 200 may be used in a downhole fracturing operation to isolate a zone of the formation 115 below the frac plug 200. Referring now to FIG. 3, with continued reference to FIG. 2, the frac plug 200 is shown disposed between producing zone A and producing zone B in formation 115. In a conventional fracturing operation, before, after, or in conjunction with setting the frac plug 200 to isolate zone A from zone B, a plurality of perforations 300 are made by a perforating tool (not shown) through the casing 125 and cement 127 to extend into producing zone A. Then a well stimulation fluid is introduced into the wellbore 120, such as by lowering a tool (not shown) into the wellbore 120 for discharging the fluid at a relatively high pressure or by pumping the fluid directly from the derrick 112 (FIG. 1) into the wellbore 120. The well stimulation fluid passes through the perforations 300 into producing zone A of the formation 115 for stimulating the recovery of fluids in the form of oil and gas containing hydrocarbons. These production fluids pass from zone A, through the perforations 300, and up the wellbore 120 for recovery at the surface 105 (FIG. 1).

The frac plug 200 is then lowered by the tool string 118 (FIG. 1) to the desired depth within the wellbore 120, and the sealing element 285 (FIG. 2) is set against the casing 125, thereby isolating zone A as depicted in FIG. 3. Due to the design of the frac plug 200, the flowbore 205 (FIG. 2) of the frac plug 200 allows fluid from isolated zone A to flow upwardly through the frac plug 200 while preventing flow downwardly into the isolated zone A. Accordingly, the production fluids from zone A continue to pass through the perforations 300, into the wellbore 120, and upwardly through the flowbore 205 of the frac plug 200, before flowing into the wellbore 120 above the frac plug 200 for recovery at the surface 105.

After the frac plug 200 is set into position, as shown in FIG. 3, a second set of perforations 310 may then be formed through the casing 125 and cement 127 adjacent intermediate producing zone B of the formation 115. Zone B is then treated with well stimulation fluid, causing the recovered fluids from zone B to pass through the perforations 310 into the wellbore 120. In this area of the wellbore 120 above the frac plug 200, the recovered fluids from zone B will mix with the recovered fluids from zone A before flowing upwardly within the wellbore 120 for recovery at the surface 105.

If additional fracturing operations will be performed, such as recovering hydrocarbons from zone C, additional frac plugs 200 may be installed within the wellbore 120 to isolate each zone of the formation 115. Each frac plug 200 allows fluid to flow upwardly therethrough from the lowermost zone A to the uppermost zone C of the formation 115, but pressurized fluid cannot flow downwardly through the frac plug 200.

After the fluid recovery operations are complete, the frac plug 200 must be removed from the wellbore 120. In this context, as stated above, at least a portion of the sealing element 285 and/or body 210 (FIG. 2) of the frac plug 200 may degrade by exposure to the wellbore environment. For example, the sealing element 285 and/or the body 210 may degrade upon contact or prolonged contact with aqueous fluids present naturally or introduced in the wellbore 120. Other combinations of degradability are suitable, without departing from the scope of the present disclosure, as discussed above, for example.

Accordingly, in an embodiment, the frac plug 200 is designed to decompose over time while operating in a wellbore environment, thereby eliminating the need to mill or drill the frac plug 200 out of the wellbore 120. Thus, by exposing the frac plug 200 to an aqueous fluid, at least some of its components will decompose, causing the frac plug 200 to lose structural and/or functional integrity and release from the casing 125. The remaining components of the frac plug 200 will simply fall to the bottom of the wellbore 120. In various alternate embodiments, degrading one or more components of a downhole tool 100 performs an actuation function, opens a passage, releases a retained member, or otherwise changes the operating mode of the downhole tool 100. Also, as described above, the material or components embedded therein for forming the body 210 and sealing element 285 of the frac plug 200, as well as the use of the optional sheath, may be selected to control the decomposition rate of the frac plug 200.

Referring again to FIG. 1, removing the downhole tool 100 from its attachment in the wellbore 120 is more cost effective and less time consuming than removing conventional downhole tools, which require making one or more trips into the wellbore 120 with a mill or drill to gradually grind or cut the tool away. Instead, the downhole tools 100 described herein are removable by simply exposing the tools 100 to a naturally occurring or standard downhole environment (e.g., aqueous fluids present in a standard downhole operation, temperatures, and the like) over time. The foregoing descriptions of specific embodiments of the downhole tool 100, and the systems and methods for removing the biodegradable tool 100 from the wellbore 120 have been presented for purposes of illustration and description and are not intended to be exhaustive or to limit this disclosure to the precise forms disclosed. Many other modifications and variations are possible. In particular, the type of downhole tool 100, or the particular components that make up the downhole tool 100 (e.g., the body and sealing element) may be varied. For example, instead of a frac plug 200 (FIG. 2), the downhole tool 100 may comprise a bridge plug, which is designed to seal the wellbore 120 and isolate the zones above and below the bridge plug, allowing no fluid communication in either direction. Alternatively, the biodegradable downhole tool 100 could comprise a packer that includes a shiftable valve such that the packer may perform like a bridge plug to isolate two formation zones, or the shiftable valve may be opened to enable fluid communication therethrough. Similarly, the downhole tool 100 could comprise a wiper plug or a cement plug.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include Embodiment A, Embodiment B, and Embodiment C:

Embodiment A

A downhole tool comprising: a body; and at least one sealing element comprising an aqueous-degradable thermoplastic rubber copolymer composed of a thermoplastic component and a rubber component, wherein the thermoplastic component is present in an amount of about 5% to about 95% by weight of the aqueous-degradable thermoplastic rubber copolymer, and wherein at least a portion of the sealing element hydrolytically degrades when exposed to an aqueous fluid.

Embodiment B

A method comprising: installing a downhole tool in a wellbore, the downhole tool comprising a body and at least one sealing element comprising an aqueous-degradable thermoplastic rubber copolymer composed of a thermoplastic component and a rubber component, wherein the thermoplastic component is present in an amount of about 5% to about 95% by weight of the aqueous-degradable thermoplastic rubber copolymer, and wherein at least a portion of the sealing element hydrolytically degrades when exposed to an aqueous fluid, fluidly sealing two sections of the wellbore with the sealing element of the downhole tool, the sealing element capable of holding a differential pressure; performing a downhole operation; and hydrolytically degrading at least a portion of the sealing element by exposure to an aqueous fluid in the wellbore environment, such that the sealing element no longer is capable of holding the differential pressure.

Embodiment C

A system comprising: a tool string extending through a surface and into a wellbore; and a downhole tool connected to the tool string, the downhole tool comprising: a body, and at least one sealing element comprising an aqueous-degradable thermoplastic rubber copolymer composed of a thermoplastic component and a rubber component, wherein the thermoplastic component is present in an amount of about 5% to about 95% by weight of the aqueous-degradable thermoplastic rubber copolymer, and wherein at least a portion of the sealing element hydrolytically degrades when exposed to an aqueous fluid.

Embodiments A, B, and C may have one or more of the following additional elements in any combination:

Element 1

Wherein the thermoplastic component is an aliphatic polyester.

Element 2

Wherein the thermoplastic component is a polylactic acid.

Element 3

Wherein the rubber component is a polyurethane-based rubber.

Element 4

Wherein the rubber component is a polyurethane-based rubber containing an ester polyol.

Element 5

Wherein the thermoplastic component is present in an amount of greater than 50% by weight of the aqueous-degradable thermoplastic rubber copolymer.

Element 6

Wherein the downhole tool is a frac plug.

Element 7

Wherein at least a portion of the body is composed of a degradable metal material that is degradable when exposed to a wellbore environment, the degradable metal selected from the group consisting of a magnesium alloy, an aluminum alloy, and any combination thereof.

Element 8

Wherein the downhole tool is capable of being disposed in a wellbore to fluidly seal two sections thereof.

Element 9

Wherein at least a portion of the body is composed of a degradable metal material that is degradable when exposed to a wellbore environment, and further comprising degrading the portion of the body that is degradable.

By way of non-limiting example, exemplary combinations of the above elements, which combinations are applicable to Embodiments A, B, and C, include: 1-9, 1, 2, and 5; 3 and 8; 4, 5, and 8; 2 and 7; 6, 7, and 9; 1 and 5; 3, 4, and 6; 2 and 8; 4, 7, and 9; and the like.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:
1. A downhole tool comprising:
a body; and at least one sealing element comprising an aqueous-degradable thermoplastic rubber copolymer composed of a thermoplastic component and a rubber component,
wherein the thermoplastic component is present in an amount of about 5% to about 95% by weight of the aqueous-degradable thermoplastic rubber copolymer, and the thermoplastic component has a degradation rate of about 0.01 mm/hr to about 2 mm/hr,
wherein at least a portion of the sealing element hydrolytically degrades when exposed to an aqueous fluid,
wherein the sealing element is at least partially encapsulated with an encapsulating material to prolong degradation of the sealing element, and
wherein at least a portion of the body is composed of a degradable metal material that is degradable when exposed to a wellbore environment, the degradable metal selected from the group consisting of a magnesium alloy, an aluminum alloy, and any combination thereof.

2. The downhole tool of claim 1, wherein the thermoplastic component is an aliphatic polyester.

3. The downhole tool of claim 1, wherein the thermoplastic component is a polylactic acid.

4. The downhole tool of claim 1, wherein the rubber component is a polyurethane-based rubber.

5. The downhole tool of claim 1, wherein the rubber component is a polyurethane-based rubber containing an ester polyol.

6. The downhole tool of claim 1, wherein the thermoplastic component is present in an amount of greater than 50% by weight of the aqueous-degradable thermoplastic rubber copolymer.

7. The downhole tool of claim 1, wherein the downhole tool is a frac plug.

8. The downhole tool of claim 1, further comprising a wellbore, wherein the downhole tool is capable of being disposed in the wellbore to fluidly seal two sections thereof.

9. A method comprising:
installing a downhole tool in a wellbore, the downhole tool comprising a body and at least one sealing element comprising an aqueous-degradable thermoplastic rubber copolymer composed of a thermoplastic component and a rubber component,
wherein the thermoplastic component is present in an amount of about 5% to about 95% by weight of the aqueous-degradable thermoplastic rubber copolymer, and the thermoplastic component has a degradation rate of about 0.01 mm/hr to about 2 mm/hr,
wherein at least a portion of the sealing element hydrolytically degrades when exposed to an aqueous fluid,
wherein the sealing element is at least partially encapsulated with an encapsulating material to prolong degradation of the sealing element, and
wherein at least a portion of the body is composed of a degradable metal material that is degradable when exposed to a wellbore environment, the degradable metal selected from the group consisting of a magnesium alloy, an aluminum alloy, and any combination thereof:
fluidly sealing two sections of the wellbore with the sealing element of the downhole tool, the sealing element capable of holding a differential pressure;
performing a downhole operation; and
hydrolytically degrading at least a portion of the sealing element by exposure to the aqueous fluid in the wellbore environment, such that the sealing element no longer is capable of holding the differential pressure.

10. The method of claim 9, wherein the thermoplastic component is an aliphatic polyester.

11. The method of claim 9, wherein the thermoplastic component is a polylactic acid.

12. The method of claim 9, wherein the rubber component is a polyurethane-based rubber.

13. The method of claim 9, wherein the rubber component is a polyurethane-based rubber containing an ester polyol.

14. The method of claim 9, wherein the thermoplastic component is present in an amount of greater than 50% by weight of the aqueous-degradable thermoplastic rubber copolymer.

15. The method of claim 9, wherein the downhole tool is a frac plug.

16. The method of claim 9, further comprising: degrading the portion of the body that is degradable.

17. A system comprising:
a tool string extending through a surface and into a wellbore; and a downhole tool connected to the tool string, the downhole tool comprising: a body, and
at least one sealing element comprising an aqueous-degradable thermoplastic rubber copolymer composed of a thermoplastic component and a rubber component,
wherein the thermoplastic component is present in an amount of about 5% to about 95% by weight of the aqueous-degradable thermoplastic rubber copolymer, and the thermoplastic component has a degradation rate of about 0.01 mm/hr to about 2 mm/hr,
wherein at least a portion of the sealing element hydrolytically degrades when exposed to an aqueous fluid,
wherein the sealing element is at least partially encapsulated with an encapsulating material to prolong degradation of the sealing element, and
wherein at least a portion of the body is composed of a degradable metal material that is degradable when exposed to a wellbore environment, the degradable metal selected from the group consisting of a magnesium alloy, an aluminum alloy, and any combination thereof.

18. The system of claim 17, wherein the thermoplastic component is present in an amount of greater than 50% by weight of the aqueous-degradable thermoplastic rubber copolymer.

* * * * *